March 14, 1933.   J. D. DUUCK   1,901,089
HOG FEEDER
Filed Feb. 24, 1928   2 Sheets-Sheet 1
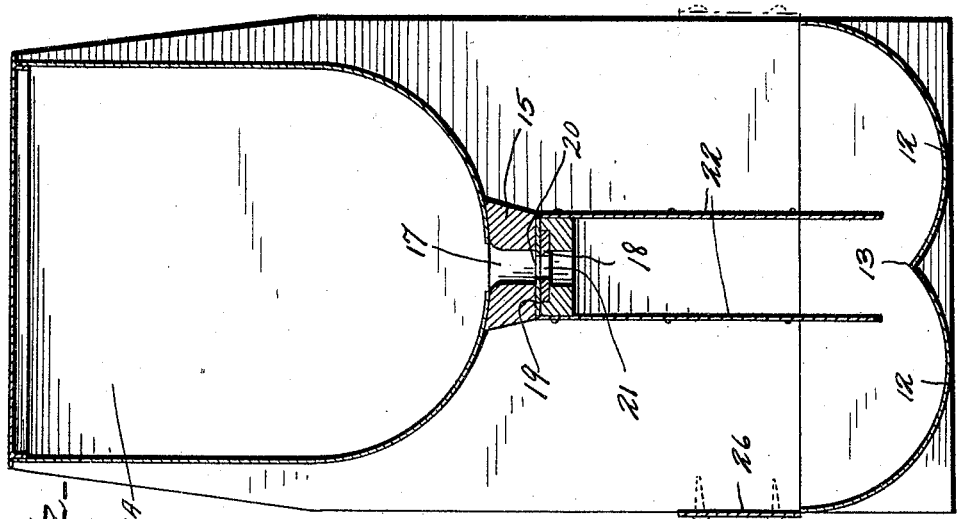
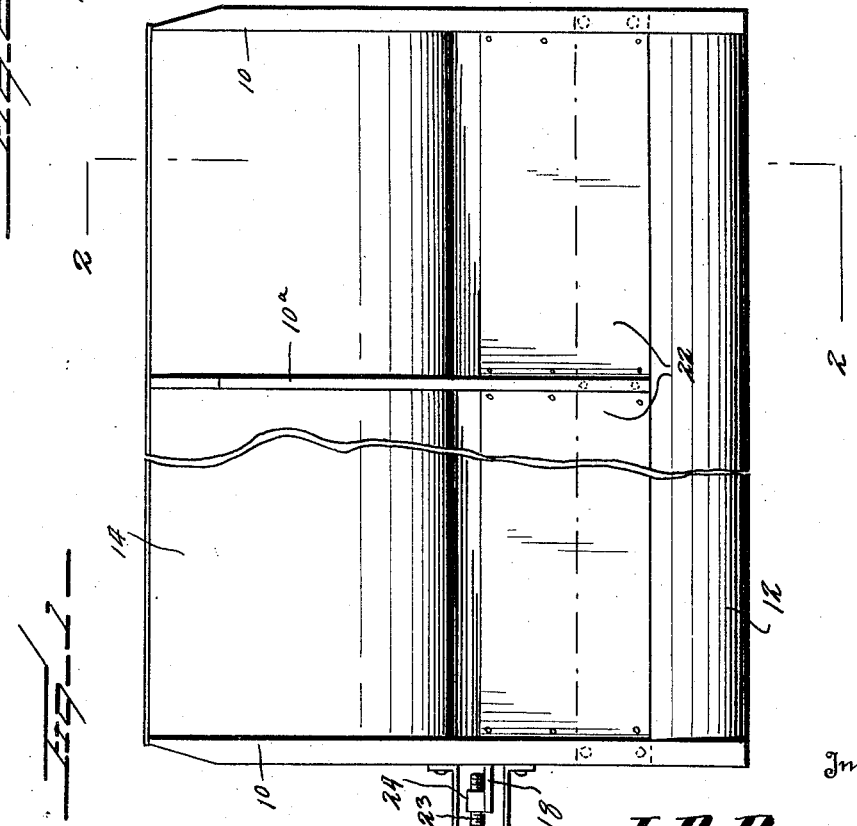
Inventor
J. D. Duuck
By Watson E. Coleman
Attorney

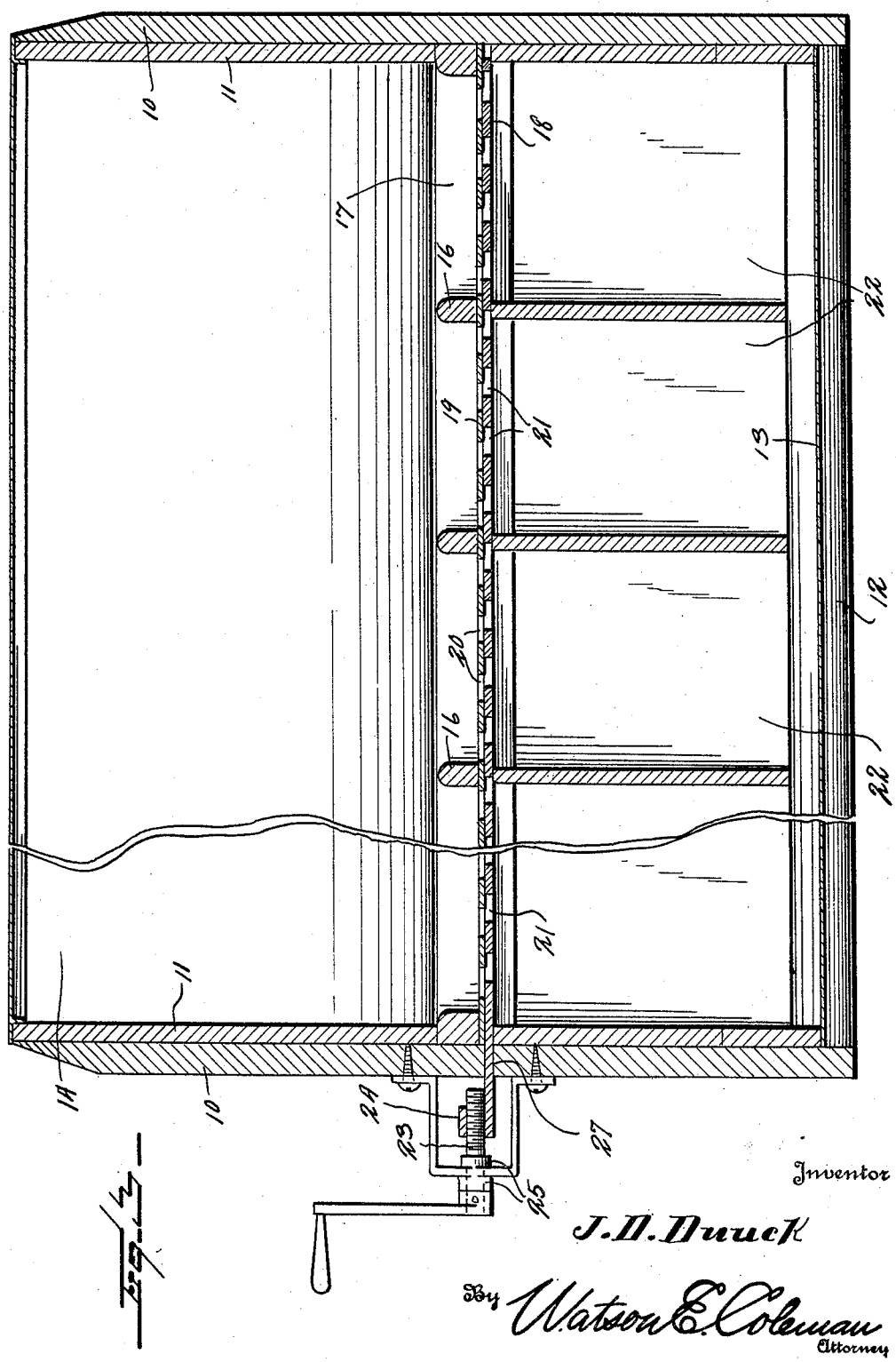

Patented Mar. 14, 1933

1,901,089

UNITED STATES PATENT OFFICE

JOSIAS D. DUUCK, OF SEQUIM, WASHINGTON

HOG FEEDER

Application filed February 24, 1928. Serial No. 256,780.

This invention relates to hog feeders or like devices, and particularly to that class of hog feeders wherein a trough is provided, and means for discharging feed or slop into the trough.

The general object of the present invention is to provide a device of this character which is simple in structure, which is effective in use, which may be cheaply made, and which particularly is provided with means whereby the slop or other food may be distributed more or less uniformly along the trough so that every hog can secure a proper amount of food.

A further object is to provide a feeder of this character with an upper trough into which the farmer pours the slop or places the feed, a lower trough from which the hogs take the feed or slop, and a passageway or duct extending along the upper trough and discharging all along the lower trough, and provided with a slide valve whereby the farmer may first entirely fill the upper trough with slop and then, by shifting the valve, permit the slop to fall uniformly through said duct and be discharged at a plurality of points into the lower trough.

A still further object is to provide a structure of this character which by a slight change may be adapted for use with dry feed or with slop.

Another object is to provide means for preventing young pigs from feeding at the trough, if necessary, or permit such feeding, this means being in the form of a detachable shield applied to the feeding trough and removable at will.

Still another object is to prevent the collection of feed or slop in the middle of the feeding trough where it is inaccessible to the hogs and to so form the feeding trough that there will be no such collection but that the slop will be placed where it will be convenient for the hogs without causing the hogs to attempt to climb into the trough.

Other objects will appear in the course of the following description.

My invention is illustrated in the accompanying drawings, wherein:—

Figure 1 is a side elevation of a feed trough constructed in accordance with my invention;

Figure 2 is a section on the line 2—2 of Figure 1;

Figure 3 is a longitudinal sectional view of the feed trough taken substantially through the longitudinal center thereof.

Referring to these drawings, it will be seen that this hog feeder comprises the end members 10, which may be made of wood, metal or any other suitable material, these end members being formed with or carrying the semi-circular trough ends 11 bolted at the top and bottom. The lower trough 12 extends longitudinally of the structure and preferably is so formed as to provide a longitudinally extending raised portion 13 at the middle of the lower trough 12 and extending the full length thereof. The upper trough 14 is supported by the members 10 at its ends and by an intermediate support 10a which fits the upper trough but does not extend down into the lower trough but rests upon the sides of the lower trough. The upper trough is formed with a longitudinally extending channel 17 intersected by braces 16 and having depending guides 15 and 15′.

Below this channel extends the floor 19, and operating between the guides 15 and the floor of the channel is a slide 18, this slide being formed with apertures 21, which in one position of the slide are adapted to register with apertures 20 formed in the floor 19. If the slide be moved from this registering position in one direction or the other, the effective area of the openings will be decreased and if the slide be shifted so that its openings are entirely out of register with the openings 20, discharge from the trough 14 is entirely prevented or cut off. Extending downward from the sides of the channel 17 are the lateral walls 22. These lateral walls define a longitudinally extending duct discharging into the feeding trough 12 and along the longitudinal median line thereof.

For the purpose of operating the controlling slide 18, I preferably use a screw-threaded crank 23 which has screw-threaded engagement with the slide at 24 and which has screw-threaded engagement with an outwardly projecting bracket 25. Obviously this exact construction might be modified without departing from the spirit of the invention. When this screw is turned in one direction, this slide will be shifted in one direction and a reverse movement of the screw will reverse the movement of the slide. The braces 16 act to support and brace the channel and support the weight of the slide and braces may extend across the upper trough, if necessary, at any desired point.

It will be seen that by the means described the farmer may fill the upper trough with slop or feed with the slide closing the apertures 20 and then open the slide, whereupon the feed will be uniformly distributed into the trough 14 along the entire length thereof so that no hog will have more feed in front of him than any other hog. Where dry feed is being fed, the trough 14 may be of such size as to accommodate a large quantity of feed and act as a magazine. The valve or slide 18 may be left off and the side walls 22 carried down into the lower trough so that a constant level of dry feed may be maintained in this lower trough in an obvious manner. The upper and lower troughs may be made of heavy galvanized iron and the lower trough should have its rim flanged or beaded so as to prevent the hogs from being cut against the sharp edge of the trough. The trough should set upon a slight platform and be provided at one end with normally plugged openings whereby the trough may be drained for cleaning. The lower trough should be at such a height as to permit small pigs to feed therefrom and then as the pigs grow a shield or flange 26 may be attached to the trough and extend upward from the same so as to raise the height of the trough in accordance with the growth of the pigs, or such a shield or flange might be used for preventing small pigs from feeding out of the trough but permitting large pigs to feed therefrom. Of course, it will be understood that the slide is entirely detachable by releasing the bracket 25 and removing the screw-threaded crank to the slide through the opening 27 in the end member 10.

I claim:—

A hog feeder as described comprising a magazine having a longitudinally disposed channel in the bottom thereof, a pair of feed troughs positioned beneath said magazine, a channeled feed guiding member secured to the bottom of the magazine, an apertured bottom member secured to the bottom of said feed guiding member, an apertured slide member engaging said bottom member, a pair of guard plates dependingly supported above said troughs on opposite sides of said feed guiding member, a plate engaging the outer edge of one of said troughs, means for securing said plate in upstanding position, and slide operating means carried by an end of the magazine, said slide operating means consisting of a bracket mounted on one end wall of the magazine, an internally threaded lug secured to one end of the apertured slide member, and a crank journaled in the bracket and having a screw threaded shank engaging the internal threads of the lug to shift the slide member longitudinally.

In testimony whereof I hereunto affix my signature.

JOSIAS D. DUUCK.